United States Patent
Gallimore

[15] 3,636,689
[45] Jan. 25, 1972

[54] DUAL SELF-CLEANING RAKE

[72] Inventor: John W. Gallimore, P.O. Box 13, Fredericksburg, Va. 22401

[22] Filed: July 3, 1969

[21] Appl. No.: 839,014

[52] U.S. Cl. ..................................................56/400.1
[51] Int. Cl. ..................................................A01d 7/00
[58] Field of Search................56/400.1, 400.03, 400.05, 56/400.11

[56] References Cited

UNITED STATES PATENTS 1,360,813  11/1920  Stoodf ...............................56/400.1

Primary Examiner—Robert Peshock
Attorney—Elizabeth Newton Dew

[57] ABSTRACT

A hand-manipulable rake for lawn and garden use wherein two sets of rake teeth are interpivotally connected and related in a way such that pivoting of the two from a first normal and operating position to a second or cleaning position, acts at one and the same time to clean both rakes of accumulated debris. Pivoting is effected in a simple direct manner by the movement axially of the rake handle, of an end cap carried thereby. In operating position the two sets of teeth are fixedly related and freely alternatively usable so that the time interval between tooth-cleaning operations is more than doubled.

9 Claims, 5 Drawing Figures

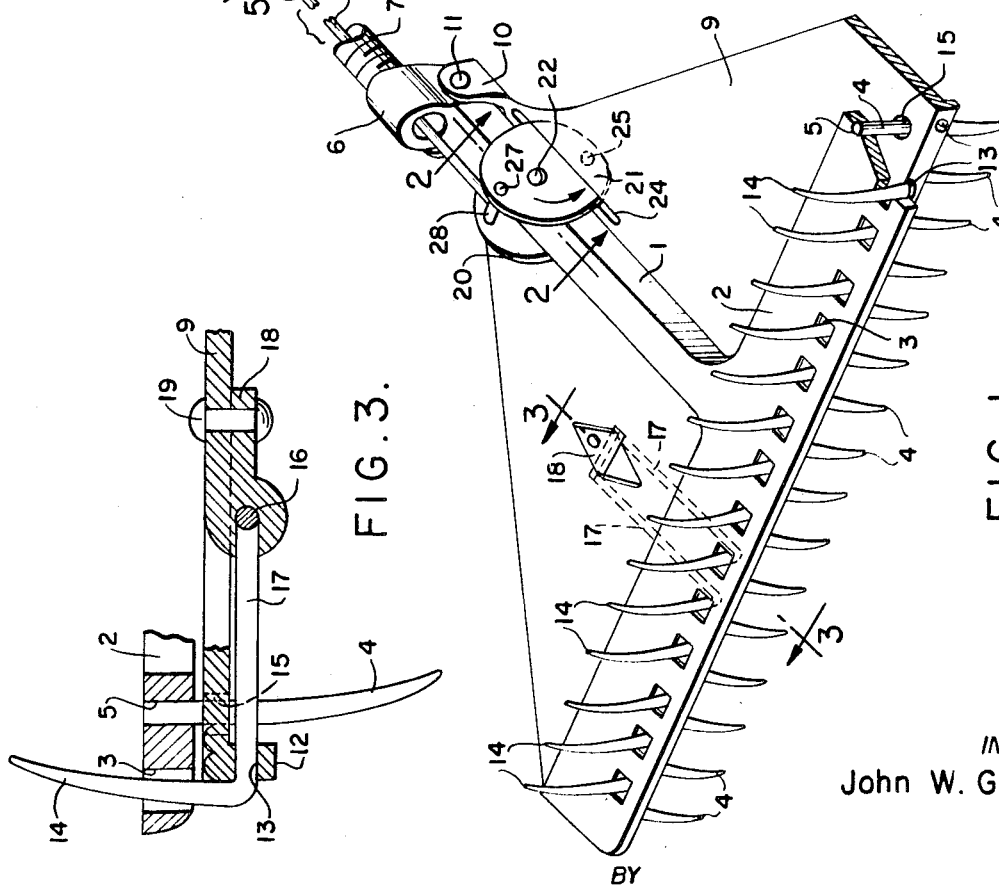
INVENTOR
John W. Gallimore
BY
Elizabeth Newton Sew
ATTORNEY

DUAL SELF-CLEANING RAKE

This invention relates to hand-manipulable rakes for lawn and garden use and more particularly to a rake provided with means by which its teeth may be readily and facilely cleaned and cleared of debris accumulating on and between them.

In lawn and garden work with a rake, much time is consumed in the removal of debris such as leaves, grass and roots, which unavoidably gather on and between the teeth. Accumulation is usually rapid so that every few minutes work must be stopped while the teeth are cleaned. When this must be done by hand, as with ordinary rakes, a great deal of time is wasted in what is ordinarily a disagreeable and dirty operation.

It is the chief purpose and object of my invention to provide a rake of the type aforesaid, which is easily cleaned, without soiling the hands, merely by movement of a manipulable part of the rake handle.

A further object is to provide a rake having two sets of teeth which are alternatively usable and which thereby at least double the time intervals between cleaning periods.

Still another object is the provision of a rake as in the preceding paragraph wherein both sets of teeth are cleaned at one and the same time by one and the same operation of the manipulable part, as by sliding the part on and along the rake handle.

Yet another object is to provide a rake of the type described which, while extremely versatile and facile in use is, at the same time relatively simple and inexpensive to construct and assemble.

Another object is to provide a hand rake of the type mentioned, which is rugged, constructed of a few easily fabricated or standard parts, long lived, and smoothly and easily operated for its intended purposes. Other objects and advantages will become clear to those skilled in the art, after a study of the following detailed description in connection with the accompanying drawing. In the drawing:

FIG. 1 is a perspective view of a rake embodying the invention, showing the two sets of oppositely directed teeth in operating position, parts being broken away at the lower right to more clearly illustrate the construction and relation of the two sets of teeth;

FIG. 2 is a detail sectional view to an enlarged scale, taken about in a plane identified by line 2—2, FIG. 1, and showing in full lines the relation of the parts when the two rakes are in operating position and relation, and in dotted lines the position of one rake with respect to the other when the parts are moved in a cleaning operation;

FIG. 3 is a detail sectional view, also to an enlarged scale about in a plane as identified by line 3—3, FIG. 1, showing the construction by which the teeth of one set are anchored to their backing plate or support, and the relation of the two sets of teeth in operating position;

FIG. 4 is a detail enlarged view, partly in section, of the connection between the operating rod and disks for effecting relative pivoting of the two sets of teeth in a cleaning action; and FIG. 5 is an axial section taken in a plane identified by line 5—5, FIG. 1, showing the end cap of the handle and by which the two sets of teeth are relatively pivoted in a cleaning action.

Referring in detail to the drawing and to FIG. 1 in particular, 1 identifies a steel shank of one rake which for purpose of distinguishing between the two will be termed the "first" rake. The shank is shown as essentially square in cross section, but may be rectangular, circular or of any other regular geometrical form. At its lower end shank 1 has a crossbar 2 integrally attached and extending at right angles thereto. As best shown at FIGS. 1 and 3, bar 2 has a plurality of holes 3 regularly spaced in and extending along a line parallel with and adjacent its lower straight edge, there being one hole for each tooth of the other rake which for purposes of ready identification will be termed the "second" rake.

Bar 2 is shown as generally flat and rectangular in cross section. Along a second line parallel with and closely adjacent the aforesaid row of holes, the bar has a row of uniformly spaced teeth 4 depending therefrom. While the shape, length, size and manner of securement of these teeth to bar 2 may be widely varied, I have shown one tooth 4 as being welded or sweated in a hole 5 in bar 2, it being understood that all other teeth 4 of the first rake may be similarly shaped and integrally attached to the bar in the same way.

At its upper end shank 1 is equipped with a sleeve 6. The sleeve is rigidly and integrally attached to the shank with its axis parallel to and upwardly offset therefrom. The upper end of the sleeve is internally threaded to receive the lower threaded end of tubular handle 7 surmounted by an end cap 8 slidably mounted on the handle, as and for the purpose subsequently described.

The second rake is shown to consist of a stiffened metal plate 9 which may be of aluminum, and is generally in the shape of an isosceles triangle. At its upper end this plate is formed with integral upstanding parallel ears one of which is identified at 10, FIG. 1. The ears are transversely spaced to receive between them with a smooth fit, the contiguous upper end of shank 1. A pivot pin 11 passes through aligned holes in the shank and ears and connects the two rake elements for limited pivotal movement about the axis of the pin, from about the position shown in solid lines for plate 9, FIG. 2, to the dotted line position.

At and along its lower straight edge plate 9 is turned downwardly as shown at FIGS. 1 and 3, to form a narrow flange 12. This flange is pierced with a number of uniformly spaced holes 13 corresponding to the number of teeth 14 of the second rake element. While it is possible to secure teeth 14 to plate 9 in a large number of different ways I have shown a particularly advantageous connection upon FIGS. 1 and 3. In this procedure, teeth 14 are formed in pairs, as the bent ends of a length of metal rod such as aluminum, and which has sufficient strength to withstand the forces developed in raking. As best shown at FIG. 1 the rod is bent to form a central bight portion 16 from the ends of which extend two parallel arms 17. The arms extend in the same direction to and through respective holes 13 in flange 12. The two ends of the rod are then bent upwardly as shown at FIG. 3, to form respective teeth 14.

Plate 9 is sheared at an appropriate number of locations, depending upon the number of teeth 14, along the two sides of an isosceles triangle. The baseline of the triangle is left intact and extends parallel with flange 12 so that the sheared portion defines a flap 18 which is curled about bight portion 16 of its pair of teeth, and riveted at 19. The flap makes a snug fit about and between the bight 16 and arms 17, respectively, so that each corresponding pair of teeth is firmly united to plate 9.

It will be understood that while, to avoid excessive and confusing details upon FIG. 1, only one tooth rod is shown attached to plate 9 in the way just described, all other rake teeth 14 may be similarly formed and secured in place to plate 9. Of course, the lengths of arms 17 of each tooth rod will decrease uniformly from the centerline of plate 9, outwardly in both directions to thus conform to the triangular shape of the plate.

As illustrated upon FIGS. 1 and 3, each rake tooth 14 extends upwardly through a respective one of holes 3 in the lower edge of crossbar 2 of the first rake. Likewise each tooth 4 of the first rake element extends downwardly through a respective one of a row of holes 15 in plate 9. This row is, of course, parallel with flange 12. Each hole 15 will preferably be located in a respective one of a plurality of planes normal to flange 12, each passing midway between two contiguous teeth 4. Thus in a way clear from inspection of FIGS. 1 and 3, when plate 9 and its teeth 14 are pivoted as a unit, downwardly about the axis of pin 11, any debris accumulated on or between the sets of teeth 4 and 14, is cleared and drops away by the single pivotal movement.

Pivotal movement as aforesaid is effected in a smooth, reliable way by the invention. A pair of disks 20, 21 are shown pivoted at their centers by pivot pin 22 which passes through a hole 23 in shank 1 and through both disks. As is conventional, the pivot pin may have its ends headed and threaded, respectively so that when a nut is turned down on the threaded end, the disks are held without binding, in smooth rotational contact with the respective side surfaces of shank 1.

Disks 20 and 21 at their lower edges protrude through slots in plate 9. One of these slots is indicated at 24, FIG. 1. Below plate 9 a pin 25 extends between and has its end anchored, as by threading, heading, or welding, in aligned holes in the disks. Midway between the two slots and extending parallel therewith there is a U-shaped rod 26, FIG. 2, having its ends anchored in any suitable manner, in plate 9. The construction and arrangement are such that the bight portion of rod 26 is spaced from and parallel with the lower surface of the plate and spaced therefrom a distance equal to about the diameter of pin 25. Therefore, as shown at FIG. 2, pin 25 has a smooth sliding fit between the plate and the rod so that when the disks are rotated counterclockwise about their common axis, through approximately 30°, plate 9 is pivoted about the axis of pin 11, to the position shown in dotted lines. In this dotted line position each hole 3 in bar 2 is contiguous to the end of a respective one of teeth 14 of the second rake. Likewise and at the same time, each hole 15 in plate 9 is contiguous to the end of a respective one of teeth 4 of the first rake. The exact relation of the holes and teeth in full cleaning position is not highly critical. That is to say, in the full cleaning or dotted line position of FIG. 2, each hole may be at, adjacent, or slightly free of its respective tooth. Likewise the size and shape of cleaning holes 3 and 15 are not highly critical except, of course, that the holes will be sufficiently large and disposed so that there is no binding or excessive friction between the teeth and the walls or sides of the holes during movement from operating to cleaning positions. If desired, each tooth may be slightly arcuate in a respective plane normal to and curved about the axis of pin 11. In such case the radial clearance between each tooth and its hole may be only a few millimeters, for example.

Disks 20, 21 extend above shank 1 and are there interconnected by a pivot bolt 27, FIGS. 2 and 4. A sleeve 28 surrounds the bolt and has an integral interiorly threaded socket 29 extending at 90° from its central portion. A spacer sleeve 30 is shown as surrounding bolt 27 in interposed relation between it and sleeve 28. The spacer is a little longer than sleeve 28 so that when nut 31 is tightened, sleeve 28 remains smoothly rotatable about the axis of the bolt.

A rod 32 has its lower end threaded into socket 29 and extends axially in and along tubular handle 7. As shown at FIG. 5, the rod is swiveled at its upper or outer end, as at 33, to end cap 8. In my preferred construction the upper end of handle 7 has three slots 34 in and through its wall and spaced at 120° about the axis of the handle. One of these slots is shown upon FIG. 5. The slots are parallel to the axis of the handle and each terminates at its upper end in a short circumferentially extending portion.

End cap 8 has three threaded holes in and through its lower edge, also spaced 120° about the axis of the handle. A respective one of three retaining screws, two of them appearing upon FIG. 1, is threaded into each hole. The inner ends of the screws are ground smooth for a close fit in one of slots 34. A coil spring 36 surrounds rod 32 within cap 8. One end bears upon the end of handle 7 and the other end against the end of the cap. Thus the spring urges the cap to the right as viewed upon FIG. 5, to a location where each end of each screw 35 is yieldingly held in the offset end of its slot 34.

The operation will be generally clear from the foregoing description and is resumed as follows. In the normal or operating position of the parts shown upon FIG. 1, rake teeth 4 are in position of use. When these teeth become clogged with debris, the assembly may simply be rotated 180° about the axis of handle 7 whereby teeth 14 are positioned for use. When it is desired to clean either or both sets of teeth to remove debris accumulated on or between them, it is merely necessary to grasp end cap 8, give it a slight twist to position the ends of screws 35 in the straight longitudinal portions of slots 34, then force the cap downwardly. In so doing, rod 32 is axially translated and acts to pivot disks 20, 21, and pin 25 acting on rod 26, pivots plate 9 about the axis of pin 11 to the dotted line position of FIG. 2. Thereby, in an obvious way, both sets of teeth are at one and the same time, cleared and cleaned of accumulated debris.

Since either set of teeth may be used, and since both sets are simultaneously cleared, a great deal of time and tiresome and monotonous work required where ordinary hand rakes are used, are saved. Cleaning is positive and rapid and because of the action of spring 36 and the circumferentially extending end portions of slots 34 in cooperation with screws 35, the parts are automatically returned to operating position as shown upon FIG. 1 and firmly but releasably held in such position following release of cap 8.

In the foregoing description the terms "upwardly," "downwardly" etc., are used simply as descriptive of the parts in the positions shown upon FIG. 1, it being understood that the assembly is equally useful when teeth 14 are pointed downwardly. It is contemplated also that one set of teeth may be more particularly adapted for one particular use such as lawn raking, while the other set may be constructed for another use such as in the garden.

Numerous changes in shape, size, relation and proportions of the parts, substitutions of equivalents, and other changes will become obvious to those skilled in the art, after a study of the disclosure. For example, while disks 20, 21 are or may be essentially circular to afford constant surface area contact between each disk and shank 1, they might be replaced by simple levers pivoted at 22 intermediate their ends.

Hence the foregoing disclosure is to be taken in a purely illustrative, rather than a limiting sense.

Having fully disclosed the invention, what I claim and desire to secure by Letters Patent is:

1. In a rake, first and second base members, first and second rows of teeth each secured in spaced parallel relation to a respective one of said base members, each said base member having a row of spaced apertures parallel to and adjacent its row of teeth, and means interconnecting said base members in adjacent superposed parallel relation for relative pivotal movement about a first axis parallel with and offset from said rows of teeth, with each tooth of each said base member extending through a corresponding one of said apertures in the other said base member, said first row of teeth extending from its base member in a direction opposite to the direction of extent of said second row of teeth from its base member.

2. The rake of claim 1, said first pivot axis, rows of teeth and rows of apertures all being parallel, and actuating means interconnecting said base members for pivoting about said first axis from a first position wherein the apertures in each said base member are contiguous to the roots of the teeth of the other said base member, to a second position wherein the apertures in each said base member are adjacent the ends of the teeth of the other said base member.

3. The rake of claim 2, said actuating means comprising lever means, first and second pins secured to said lever means in spaced parallel relation, means pivoting said lever means to said first base member between said pins, means slidably and pivotally connecting said first pin to said second base member, a handle attached at one end to said first base member, and operating means carried by said handle and connected with said second pin, for pivoting said lever means and thereby said base members, between their said first and second positions.

4. The rake of claim 3, said first base member comprising an elongated shank, said lever means comprising a pair of spaced disks pivoted at their central portions to and on respectively opposite sides of said shank, said first and second pins having their ends anchored to said disks at opposite peripheral portions thereof.

5. The rake of claim 3, said handle being tubular, said operating means comprising a rod extending in and along said handle, and manipulable means at the free end of said handle and connected with said rod for translating the same.

6. The rake of claim 5, said manipulable means comprising a cap fitting said tubular handle and connected with the contiguous end of said rod for translating the same and thereby pivoting said base members relatively between their said first and second positions, means yieldingly urging said cap to a limiting position outwardly along said handle, and means interposed between said cap and handle for releasably retaining said cap in said limiting position.

7. The rake of claim 1, said second base member comprising a sheet metal plate of generally isosceles triangle form, having an upturned flange along its base, said second row of teeth being formed by a plurality of rods each having a central bight and parallel arms extending from respective ends of said bight, through respective ones of a row of holes in and through said flange, then bent upwardly to form a rake tooth, and means attaching each said bight rigidly to said plate.

8. The rake of claim 7, said attaching means comprising a plurality of portions of said plate sheared and bent along a line, over and about a respective one of said bights, and a rivet secured in aligned holes in each said portion and the part of the plate contacted thereby.

9. The rake of claim 7, said first base member comprising an elongated shank and a crossbar integral with and extending at right angles to said shank, said first row of teeth being attached at their ends to and along said crossbar, said second base member also having parallel spaced ears integral with its apex portion, said interconnecting means comprising a pivot pin extending through aligned holes in said ears and said shank portion between them, a pair of disks pivoted on a common axis at their central portion to and on opposite sides of said shank, each said disk extending through a respective one of a pair of slots in said plate, handle means attached to said shank at its free end, said handle means including means connected with said disks for pivoting the same, a pin below said plate having its ends anchored in said disks, respectively, and a U-shaped rod having its ends attached to and slidably confining said pin for sliding relatively to said plate parallel therewith.

* * * * *